United States Patent [19]
Von Allworden

[11] 3,961,812
[45] June 8, 1976

[54] DEVICE FOR COUPLING A TRACTOR TO AN AGRICULTURAL IMPLEMENT AND THE LIKE

[75] Inventor: Wilhelm Von Allworden, Lohmar, Rhineland, Germany

[73] Assignee: Jean Walterscheid GmbH, Lohmar, Rhineland, Germany

[22] Filed: Sept. 5, 1975

[21] Appl. No.: 610,868

[30] Foreign Application Priority Data
Sept. 7, 1974  Germany............................ 2442900

[52] U.S. Cl........................ 280/478 R; 280/456 A; 172/275
[51] Int. Cl.². ........................................... B60D 1/08
[58] Field of Search........ 280/456 A, 460 A, 461 A, 280/477, 478 R, 479 R; 172/272, 273, 275, 248

[56] References Cited
UNITED STATES PATENTS

| | | | |
|---|---|---|---|
| 3,214,191 | 11/1965 | Johnson | 280/479 R |
| 3,285,625 | 11/1966 | Krueger | 280/402 X |
| 3,306,630 | 2/1967 | Weiste | 172/272 X |
| 3,829,128 | 8/1974 | Sutton | 280/461 A |
| 3,847,415 | 11/1974 | Geisthoff | 280/478 R |

*Primary Examiner*—M. H. Wood, Jr.
*Assistant Examiner*—R. Schrecengost
*Attorney, Agent, or Firm*—Edmund M. Jaskiewicz

[57] ABSTRACT

A tractor having a pair of parallel catch arms pivotally mounted on the rear portion of the tractor are engageable with a shield plate mounted on the implement or machine to be coupled to the tractor. The lower ends of the catch arms are pivotally mounted to a supporting bracket on the tractor and are rigidly connected by a catch plate. At least one retaining pawl is pivotally mounted on each catch arm and has a jaw opening engagable with a locking shaft. A locking element actuable by a safety linkage is pivotally mounted on the catch arm and has a curved locking surface extending eccentrically of its pivot mount for lockingly engaging the retaining pawl. The locking element is secured in position by a locking lever and the entire locking mechanism can be released only by actuation of the locking lever and the safety linkage.

11 Claims, 5 Drawing Figures

DEVICE FOR COUPLING A TRACTOR TO AN AGRICULTURAL IMPLEMENT AND THE LIKE

The present invention relates to a device for coupling an agricultural implement or some other form of machine to a tractor, more particularly, to the locking mechanism for securing coupling between the tractor and implement.

The so-called three-point linkage attachment has been conventionally provided on a tractor in order to operatively connect an agricultural implement or machine to the tractor. The upper and lower guide members found in such a three-point attachment significantly reduce accessibility to the space between the tractor and the traction bar of the machine being connected and thus makes it extremely difficult to couple the transmission shaft of the machine with the power take-off shaft of the tractor. The unconnected guides, as they extend from a tractor or other vehicle constitute a source of possible accidents in view of the confined and limited space conditions in the vicinity of the guides.

Various structures have been proposed which would permit automatic coupling and uncoupling without requiring the operator of the tractor to leave his seat. Such structures are shown, for example, in German OS Nos. 2,241,434, and 2,308,218. Such devices are generally constructed to permit automatic coupling and uncoupling of trailers utilizing a traction jaw connection as well as of machines or implements having a three-point suspension. Flange connected implements can also be coupled in such a manner. Wherein it is also necessary to provide drive from the tractor to the attached implement the transmission shaft of the implement is arranged so as to be included in the automatic coupling operation.

The disadvantage of such coupling structures is that the locking devices which are subject to wear from friction will not automatically adjust to compensate for such wear nor do they permit for compensation of manufacturing tolerances. As a result, increased wear and a safety risk is encountered in such coupling structures. Another disadvantage is always present possibility of unintentional disengagement of the coupled machines.

It is therefore the principal object of the present invention to provide a novel and improved device for coupling an implement or machine to a tractor.

It is another object of the present invention to provide a locking mechanism for such a coupling device which provides a maximum of safety against unintentional disengagement of the coupled device.

It is a further object of the present invention to provide such a locking device which will permit automatic engagement of the locking components without undue play or clearance and will provide for full and automatic compensation of any play because of wear or manufacturing tolerances.

According to one aspect of the present invention a device for coupling an agricultural implement and the like having a shield plate to a tractor may comprise a supporting bracket on the tractor. A pair of parallel catch arms are pivotally mounted at their lower ends to the supporting bracket and a catch plate rigidly interconnects the catch arms. A retaining pawl is pivotally mounted on each catch arm and has a jaw opening engagable with a locking shaft on the supporting bracket. A locking element is pivotally mounted on each of the catch arms and has a curved surface extending eccentrically of its pivot mount so that the curved surface is lockingly engagable with the retaining pawl. A locking lever is pivotally mounted on the locking element to retain the locking element in locking engagement with the retaining pawl. Safety linkage means are connected to the locking element for releasing the locking element and thereby releasing the retaining pawl from the locking shaft when the safety linkage means is actuated to pivot the locking element.

A major advantage of the coupling device according to the present invention is that automatic coupling and uncoupling can be accomplished according to high safety standards and accidents are virtually avoided. Considerable time is saved during the coupling and uncoupling operations as well as in adapting the device for different types of equipment. The subject device makes it unnecessary to provide labor for the coupling and uncoupling operation. It is also no longer necessary to apply the force previously required for aligning the tractor and machine prior to the coupling operation, particularly with the type of machine in which there was to be a power transmission connection with the power take-off shaft of the tractor.

The present invention no longer requires the driver to leave the operator's seat or his enclosure on the tractor because the catch arm is within the driver's view during the coupling operation and this significantly facilitates accurate approaching of the tractor to the shield plate of the machine to be coupled. It has been noted that accidents frequently occur when operating personnel are mounting and descending from tractors.

When the device of the present invention is particularly applied to agricultural implements it is preferred to mount the catch arm together with the locking mechanism on the tractor while the shield plate is mounted on the agricultural implement, working machine, trailer or other apparatus. The device may also be used in conjunction with conventional three-point attachment systems comprising one upper and two lower guides on the tractor. In such a combination, the device of the present invention performs the coupling function comprising the concentric alignment and operative connection of the power transmission shaft. The possibility of using the device of the present invention together with conventional and presently used attachment systems is economically advantageous since the user of the tractor is not required to change over completely his existing equipment in order to employ the present device.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
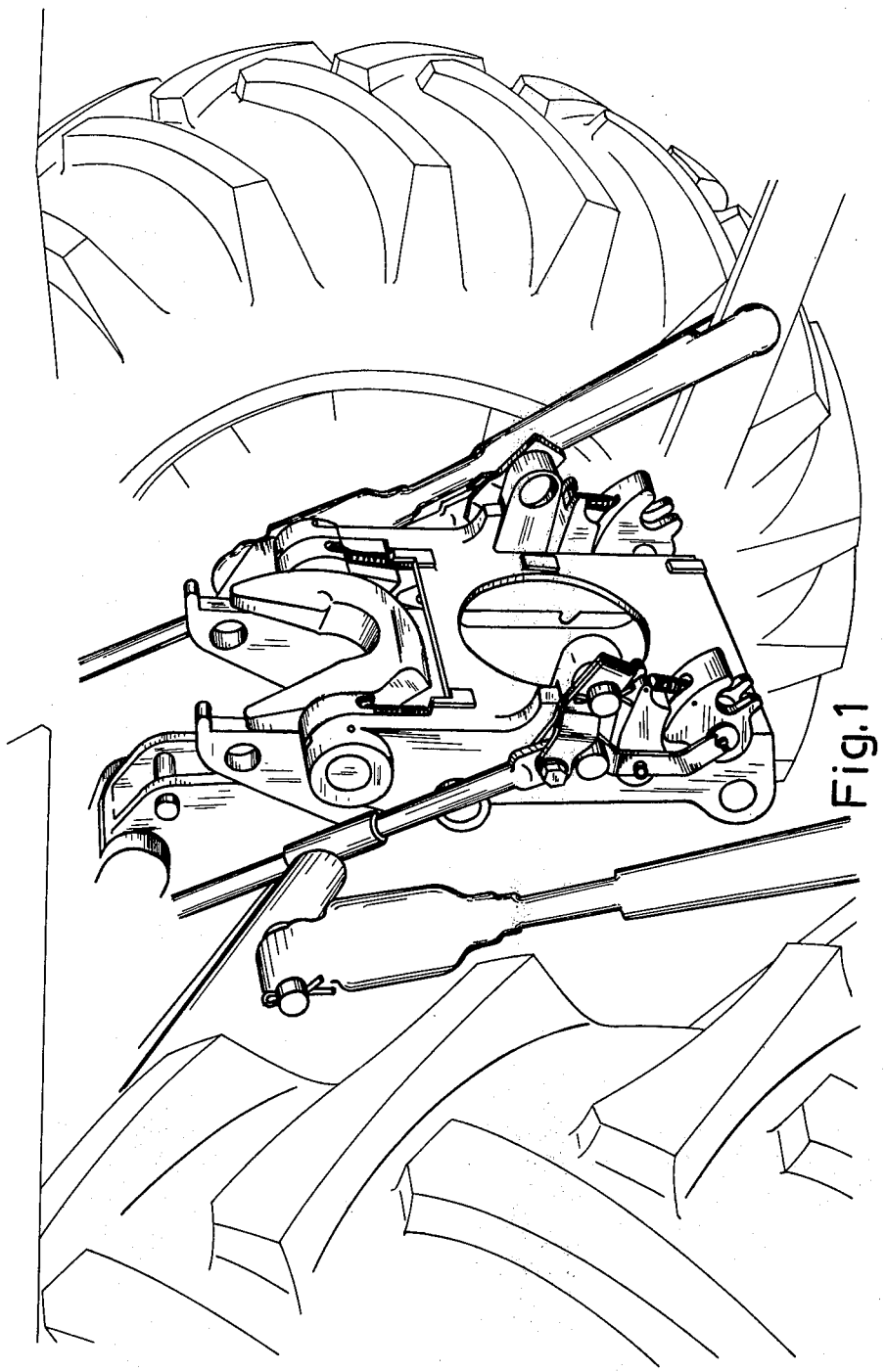
FIG. 1 is an overall perspective view of the rear portion of a tractor provided with the coupling device of the present invention.
Figure 2:
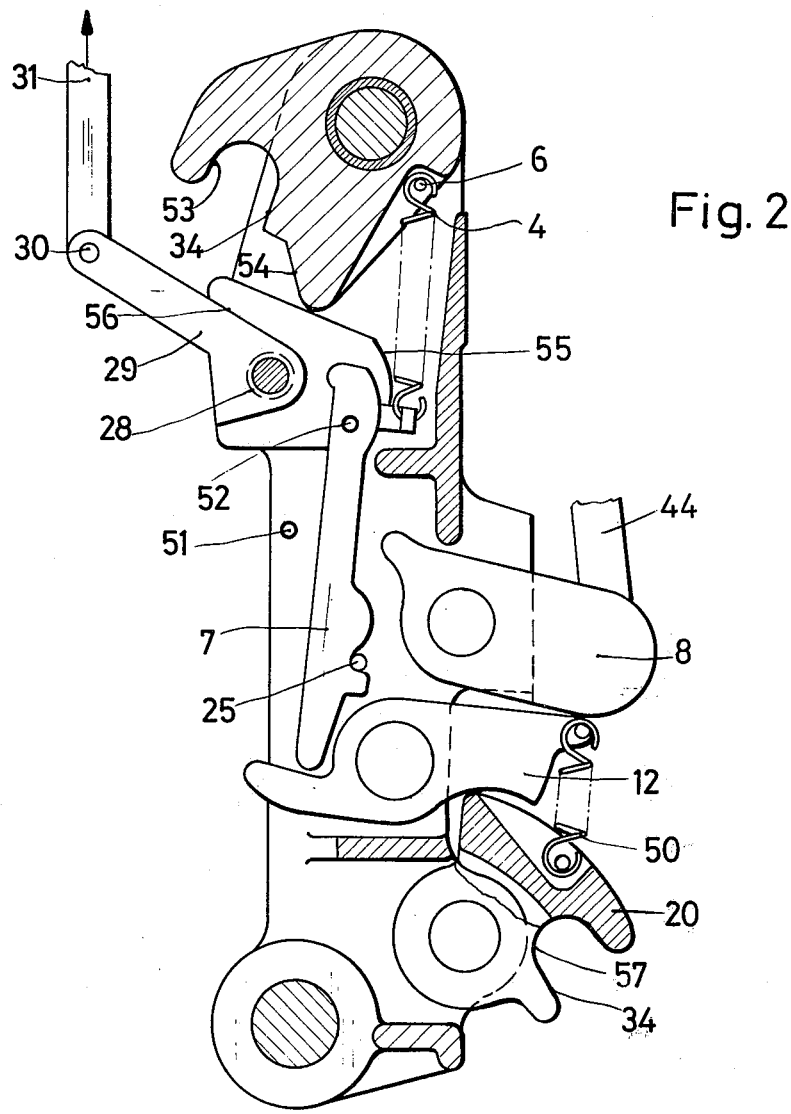
FIG. 2 is a transverse sectional view showing the coupling device in the open position.
Figure 3:
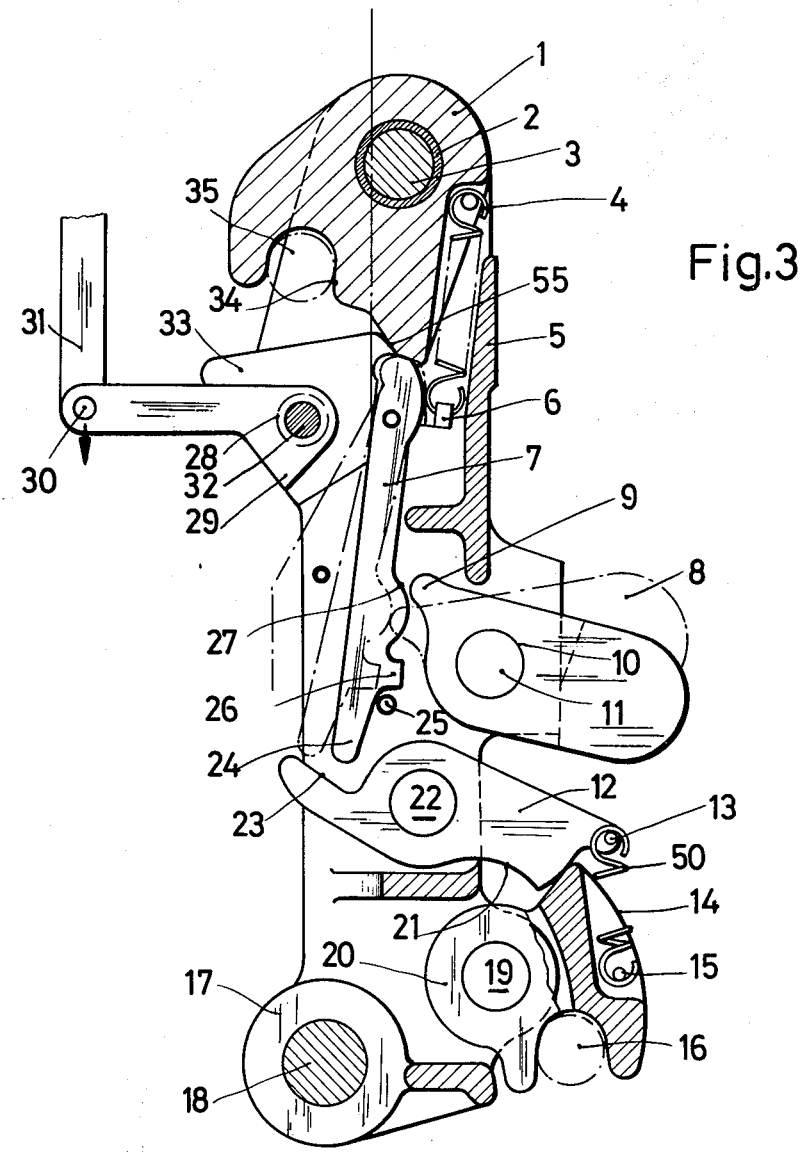
FIG. 3 is a view similar to that of FIG. 2 but showing the coupling device in locked position.
Figure 4:
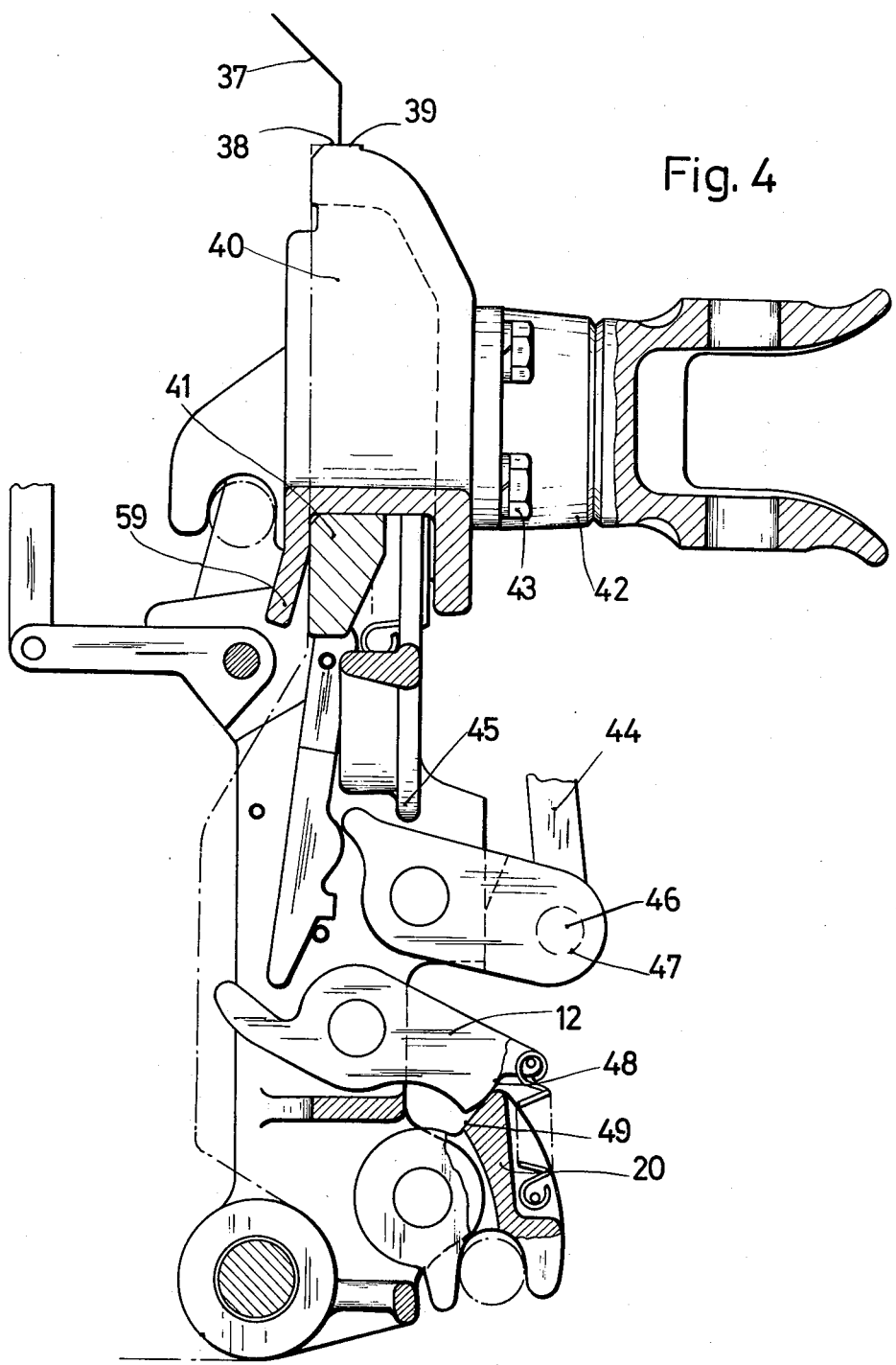
FIG. 4 is a view similar to that of FIG. 2 and showing in addition the shield plate of the coupled implement in the locked position.
Figure 5:
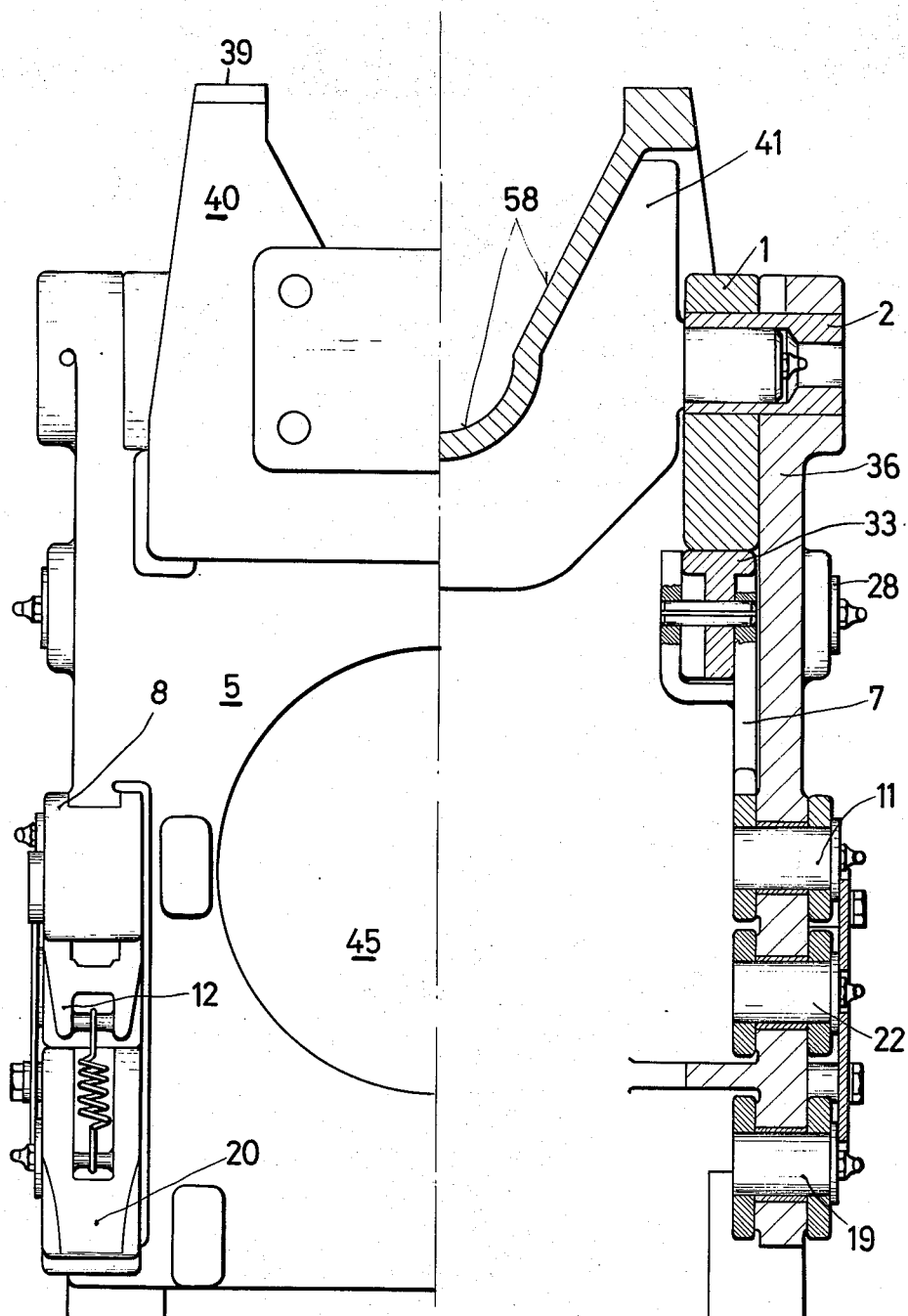
FIG. 5 is a front elevational view with one-half thereof in section of the device of FIG. 4.

In FIG. 1 there is illustrated the rear portion of an agricultural tractor upon which the coupling device according to the present invention has been mounted. The coupling device comprises a bracket 37 mounted on the tractor and shown in greater detail in FIG. 4. On the lower end of the bracket 37 there is supported a shaft 18 upon which are pivotally mounted bearings 17 formed on the lower ends of a pair of substantially parallel catch arms 36. The catch arms 36 are thus mounted for pivotal movement at their lower ends with respect to the supporting bracket 37 on the tractor.

The catch arms 36 are rigidly interconnected by a catch plate 5 provided with a circular opening 45 therein to accommodate a transmission shaft. The upper end of each catch arm 36 is provided with a bearing bushing 2 upon which is pivotally mounted an upper retaining pawl 1. Journalled within the bushing 2 is a bolt 3 extending from each side of a catch cradle 41 so that the catch cradle is pivotally mounted between the upper ends of the catch arms 36.

A tension spring 4 connects the retaining pawl 1 with a projection 6 extending laterally from a locking lever 7 whose upper end is pivotally mounted on a pin 52 carried by a locking element 33. The locking element 33 is pivotally mounted about its bearing pin 28 on the catch arm 36 and is provided with a laterally opening triangularly shaped safety recess 56. The recess 56 closely receives a correspondingly shaped end of the safety lever 29 which is mounted so as to be closely received within the recess 56. The safety lever 29 has one end correspondingly shaped so as to be closely received within the recess 56 and the safety level is pivotally mounted about its bearing bolt. The longitudinal axis of the bearing bolt for the safety element 29 on the catch plate 5 coincides when in locked position with the longitudinal axis of the bearing bolt for the safety lever 29 on the bracket 37.

The locking lever 7 which is pivotally mounted on the locking element 33 extends downwardly and in the middle third of its length, as viewed from the top, is provided with a lock release projection cam surface 27 which is engagable by a lock release cam 9 of a power lever 8 during the lock-release operation. Below the lock-release cam 27 there is provided on the locking lever 7 a locking projection or sholder 26 which in its operative locking position has its underside in contact against a projecting stop 25. The bottom end of the locking lever 7 is provided with a lock-release projection 24 which during the lock-release operation engages a lock-release arm 23 on a pawl 12 which is pivotally mounted upon a pin 22 on catch arm 36. The opposite end of the pawl 12 is connected by a tension spring 14 to a lower retaining pawl 20 which is pivotally mounted at 19 at the lower end of catch arm 36. The spring 14 is connected between spring pins 13 and 15 on the pawl 12 and lower retaining pawl 20 respectively.

The upper retaining pawl 1 is provided with a jaw opening 53 which is engagable over a locking shaft 35 on the bracket 37. The lower pawl 20 is similarly provided with a jaw opening 57 which receives a locking bolt 16 on the shield 40. Both jaw openings 53 and 57 are provided with stop surfaces 34 and 34' which initiate the locking movement. The lower retaining pawl 20 has a sliding surface 14 which is slidingly engagable on a curved surface 21 on the pawl 12 in the unlocked position. The pawl 12 is also provided with a curved locking surface 48 which is engagable with a locking surface 49 on the lower retaining pawl 20 in the locked position. Similarly, the upper retaining pawl 1 has a locking face 54 which is engagable with a locking curved surface 55 on the locking element 33 in the locked position. A power drive 44 comprising a traction member which may be a telescoping tube pivotally connects power lever 8 at pin 46 within bushing 47 to the lifting device of the tractor. Hydraulic power is thus transmitted from the lifting device to the power lever 8 to pivot the catch arms 36.

When the coupling device is fully coupled an abutment surface 38 on the bracket 37 interfits with a corresponding alignment surface 39 on the shield 40. The shield 40 is secured by bolts 43 to a traction jaw 42. The shield is provided with a projection 59 which is positioned behind the catch cradle 41 when the shield is in the coupled position. The shield is provided with a substantially chanel shaped cross-section so as to fit over the cradle 41.

The safety linkage 31 which is pivotally connected to the safety lever 29 by the pin 30 provides a connection to the operator of the tractor who may operate the coupling from his seat and detect from the position of the operating lever whether or not the coupling has been correctly locked.

For reasons of operative safety and accident prevention, the coupling device can be disengaged only if the hydraulic system has been set to "lift" from the operator's seat and subsequently, also from the operator's seat, the lock has been released by means of the safety mechanism at 31. Only then may the uncoupling operation proceed by lowering the hydraulic device.

The catch cradle 41 is provided with an upwardly directed substantially V-shaped opening and the shield plate 40 is provided with a catch section correspondingly shaped to fit over the catch cradle. The catch section of the shield plate 40 is aligned parallel with the supporting bracket 37 by the engagement of the aligning surfaces 38 and 39. By this mutual engagement of the aligning surfaces it is possible to obtain a planar engagement of the shield plate over its entire length with the corresponding support bracket face upon locking engagement of the retaining pawls. Vertical clearance is closely limited between the cradle 41 and that portion of the supporting bracket 37 which projects above the upper edge of the shield plate 40. There is no axial play because the catch section of shield plate 40 engages the catch cradle 41 and because of the automatically compensating lock for the shield resulting from the retaining pawls. In addition, the shield plate cannot be laterally displaced since it is positioned between the two catch arms 36.

The tension springs 4 between the upper retaining pawls 1 and the locking element 33 restore immediately the retaining pawls to the coupling position when the coupling device is opened. As a result, the coupling device is ready for a new coupling operation immediately after having been disengaged from a previously coupled machine or implement.

The triangular lateral recess 56 on the locking element 33 acts as a safety guideway in closely receiving a correspondingly shaped end of the safety lever 29 and also acts to transmit force. As a result of this safety guideway, the locking element 33 cannot release the retaining pawl 1 unitl the hydraulic mechnaism is first actuated to release the locking lever 7. Subsequently, the locking lever follows a pivotal movement transmitted by the safety lever 29 via the safety guideway 56 in order to release the pawl 1.

The force or power lever 8 has a release cam 9 on its inner end which is engagable with the locking lever 7. The locking lever 7 which is pivotally connected with the locking element 33 immobilizes the locking lever with respect to the safety lever 29 until the locking lever 7 has been unlocked by the release cam 9 of the power lever 8 under the action of the power lift device of the tractor. This insures that a machine or other apparatus coupled to the tractor cannot be unintentionally disengaged since the locking element 33 may be pivoted by the safety lever 29 to release the upper retaining pawl 1 only after the power lifting device of the tractor has been actuated.

The lower retaining pawls 20 have an eccentric action by means of which their jaws 57 engage over a locking bolt 16 provided on the shield plate 40. The lower retaining pawls 20 are connected by tension spring 50 with the latch pawl 12 which functions as a lock-release arm adapted to co-act with a lock-release projection 24 on the locking lever 7. The upper and lower retaining pawls, 1 and 20 respectively, can thus be closed simultaneously to insure safe locking engagement of the shield plate with respect to the tractor. The projection 24 on the locking lever 7 is disengaged from the lock-release arm 23 of pawl 12 and the retaining pawls are pivoted toward the bracket 37 by the locking bolt 16 of the shield plate when these are engaged by the jaws of the retaining pawls. At the same time the tension springs 50 are stressed between the latch and retaining pawls.

The lower retaining pawls 20 also have a locking surface adapted to co-act with an arcuate locking surface 48 on the latch pawl 12 to produce self adjusting immobilization. As a result, the arcuate locking surface 48 of the latch pawl 12 slides upwardly along the locking surface 49 of the lower retaining pawl 20 when the latch pawl is pivoted by the lower tension spring 50 until the jaw of the retaining pawl 20 is directed downwardly and the shield plate is now fixed with respect to the tractor in a self-adjusting, clearance-free position which will automatically compensate for wear and tolerances.

It is pointed out that the coupling device according to the present invention complies with the existing safety regulations generally accepted in this country.

OPERATION

In order to couple the tractor to equipment, such as a trailer or the like, the operator of the tractor reverses the tractor to move toward the equipment. The traction eye of the trailer has already been fixedly connected with the traction jaw 42 extending from the shield plate 40. Before reaching the shield plate 40, the hydraulic system of the tractor is set to lift and the safety linkage 31 is actuated by the operator and then the hydraulic system is switched over the "lower". The hydraulic system will now lift the power lever 8 through the power drive linkage 44 until the lever 8 contacts against the catch arms 36. During this movement the lever 8 pivots in a counter-clockwise direction about its pivot pin 10 such that its lock-release cam 9 pivots downwardly to engage the cam projection 27 on the locking lever 7 to release the locking lever from its arrested position on the stop 25. At this point, the first step of the safety device against unintentional disengagement of the coupling device has been released.

The safety linkage 31 can now be actuated and this pivots the locking element 33 by the safety lever 29 in such a manner that the curved locking face 55 of the locking element 33 is moved away from the locking surface 54 of the upper retaining pawl 1. Because of the eccentric pivoting movement of the locking lever 33, the upper tension spring 4 is displaced downwardly at the same time that the locking lever 7 is displaced downwardly and as a result the spring 4 is stressed.

When the locking element 33 has pivoted sufficiently so that its locking surface 55 is no longer in contact with the locking surface 53 of the upper retaining pawl 1 the upper tension spring 4 will pivot the upper retaining pawl 1 clockwise so as to release the locking shaft 35. The upper pawl 1 is now open and ready to receive the locking shaft for the next locking operation.

During the downward movement of the locking lever 7 its lock-release projection 24 will bear against the lock-release arm 23 of the pawl 12. The pawl 12 will now pivot around its pin 22 such that its locking surface 48 releases the locking surface 49 of the lower retaining pawl 20 and the lower tension spring 50 is now tensioned. Immediately afterwards the spring 50 relaxes to pivot the lower retaining pawl 20 into the coupling position. During the downward movement of the locking lever 7 its locking projection 26 engaged behind the stop 25 to maintain the locking element 33 in the open position. At this stage, the second safety step against unintentional disengagement of the coupling device has been released.

The tractor operator now switches the hydraulic system to "drop" and the catch arms 36 together with the interconnecting catch plate 5 and the locking mechanism mounted on the catch arms pivot about the pivot pin 18 in a downward direction until the catch arms are stopped at a predetermined point by the power drive 44. The catch cradle 41 will automatically pivot on its pins 3 in the bushings 2 since the lower portion of the cradle is of a heavier construction so that the cradle will always assume a vertical position and the catch opening will directed upwardly.

The tractor is again driven in the reverse direction toward the shield plate. When the cradle 41 is positioned approximately directly below the catch section 58 of the shield plate 40, the hydraulic system on the tractor is switched to lift. The cradle 41 will then move in between the projection 49 and the shield plate 40. The connection will be self-aligning because of the cooperating V-shaped confirmation of the cradle 41 and the catch section 58. The upward pivotal movement of the catch arms 36 will now pivot the shield plate 40 toward the locking device on the bracket 37 while pulling the trailer closer to the tractor.

Before the shield plate 40 has arrived in an approximately vertical position which would be parallel with the tractor bracket 37, the stop faces 34 of the upper retaining pawls 1 will engage the locking shaft 35 and the pawls 1 will pivot into the locking position with their jaw openings 53 extending over the upper half of the locking shaft 35. This pivoting movement of the pawls 1 will tension the spring 4. During this same time cycle, the locking lever 7 will be released from the stop 25 by the lock-release cam 9 on the power lever 8. The tensioned spring 4 will pull the locking lever upwardly which in turn will cause the locking element 33 to be also pivoted in the upward direction about its pin 28. At the same time, the curved locking surface 55 of the locking element 33 will slide along the locking surface 54 and because of its eccentric configuration will pull the upper retaining pawl 1 into clearance free engagement between the jaw opening 53 and the locking shaft 35. This operation also provides compensation for wear and tolerance clearance between locking element 33, upper retaining pawls 1 and locking shaft 35. The safety lever 29 follows the movements of the locking lever 38 and thus indicates to the tractor operator by means of the safety linkage 31 that the coupling device has been securely locked.

Concurrently, with the above described sequence of operations, the alignment face 39 of the shield plate 40 will engage the corresponding abutment face 38 on the bracket 37 to limit displacement of the shield plate in the upward direction. Any play or movement of the shield plate 40 in the downward direction is limited by the engagement between the catch section 58 and the cradle 41. The mutual engagement between the alignment surface 39 on the shield plate 40 and the abutment surface 38 on the bracket 37 creates a lever effect at the bracket such that the catch arms 36 are pressed firmly against the corresponding surfaces of the bracket 37 so as to preclude any play in the axial direction once the pawls have been locked. During the third of the interengaging operating sequences, the lock release arm 23 of the pawl 12 will be released by the upward movement of the locking lever 7.

During the closing pivotal movement of the catch arm 36 the lower portion of the shield plate 40 carrying the locking bolts 16 engages the stop faces 34' of the lower retaining pawls 20 which causes the pawls 20 to be pivoted downwardly such that at the end of this pivotal movement the jaw opening 57 of the lower pawls 20 will engage the upper half of the locking bolt 16. The lower tension spring 50 will now pull the pawl 12 in the downward direction to cause the locking surface 48 of the pawl 12 which is located eccentrically with respect to the pivot pin 22 of the pawl 12 to engage with the locking surface 49 of the lower retaining pawl 20. This movement pushes the jaw opening 57 of the lower locking pawl 20 firmly and without any clearance or play against the locking bolt 16 of the shield plate 40. At the same time appropriate compensation for wear and tolerance clearances is achieved.

It is therefore apparent that a tractor, implement or working machine coupled with a tractor in the manner as described above utilizing the coupling device of the present invention cannot become unintentionally disengaged or uncoupled. The result is a significant and considerable improvement with regard to operating safety and accident prevention. There are also attained improved economical and operatively safety advantages by means of the fact that the self-adjusting locking elements very effectively prevent the coupling device against high wear generally resulting from improperly aligned, non-adjustable parts and elements.

It is also apparent that the coupling device of the present invention avoids the disadvantages and drawbacks of previous coupling arrangements wherein the shield plate is locked to the attachment bracket of the tractor by means of rigid locking jaws which were not adjustable in their region of immobilization and shield hooks which when subjected to rough and heavy conditions particularly encountered in agriculture and construction were easily subjected to heavy wear and large clearances with subsequent damage to or even disengagement of the coupling device. It can be seen that the coupling device of the present invention provides that the retaining pawls which are subject to direct traction force effects are at all times coupled in a form fitting and clearance free manner with automatic compensation for wear and tolerance clearances. Further, the retaining pawls are safely locked by a self-adjusting lock mechanism including a locking element which engages the retaining pawls by means of an arcuate locking surface located eccentrically of its fulcrum.

It will be understood that this invention is susceptible to modification in order to adapt it to different usages and conditions, and accordingly, it is desired to comprehend such modifications within this invention as may fall within the scope of the appended claims.

What is claimed is:

1. In a device for coupling an agricultural implement and the like having a shield plate to a tractor, a supporting bracket on said tractor, a pair of parallel catch arms pivotally mounted at their lower ends to said supporting bracket and a catch plate rigidly interconnecting said catch arms, a retaining pawl pivotally mounted on each catch arm and having a jaw opening, a locking shaft on said supporting bracket and engagable by said pawl jaw opening, a locking element pivotally mounted on each of said catch arms and having a curved surface extending eccentrically of its pivot mounts, said curved surface being lockingly engagable with said retaining pawl, a locking lever pivotally mounted on said locking element to retain said locking element in locking engagement with said retaining pawl, and safety linkage means connected to said locking element for releasing said locking element and thereby releasing said retaining pawl from said locking shaft when said safety linkage means is actuated to pivot said locking elements.

2. In a device as claimed in claim 1 wherein said supporting bracket has an abutment surface thereon, a catch cradle pivotally mounted on the upper ends of said catch arms, said shield plate having a substantially channelled cross-section to fit over said catch cradle and having an alignment surface engagable with said bracket abutment surface.

3. In a device as claimed in claim 1 and a tension spring interconnecting said retaining pawl and said locking elements.

4. In a device as claimed in claim 1 wherein said locking element has a triangular shaped lateral recess, and a safety lever having a correspondingly shaped end received in said lateral recess.

5. In a device as claimed in claim 4 wherein said safety linkage means is connected to said safety lever.

6. In a device as claimed in claim 1 and a power lever pivotally mounted on said catch arm, means for connecting said power lever to a power source for pivoting said catch arms.

7. In a device as claimed in claim 6 wherein said tractor has power lift means thereon, and a traction member connecting said power lever to said power lift means.

8. In a device as claimed in claim 6 wherein said power has a lock release cam engagable with said locking lever, said locking lever being pivotally mounted at its upper end on said locking element.

9. In a device as claimed in claim 1 and a second retaining pawl pivotally mounted on the lower end of each catch arm and having a second jaw opening, said shield plate having a locking bolt engagable by said second jaw openings, a pawl pivotally mounted on said catch arm and having a lock release arm engagable with a release projection on said locking lever, and a second tension spring interconnecting said second retaining pawl with said pawl.

10. In a device as claimed in claim 9 wherein each of said second retaining pawls has a locking surface lockingly engagable with a locking surface on said pawl.

11. In a device as claimed in claim 2 wherein said catch cradle has an upwardly directed substantially V-shaped opening, said shield plate having a projection engagable behind said catch cradle.

\* \* \* \* \*